May 1, 1934.   O. C. ROESEN ET AL   1,957,109
PRODUCTION CONTROLLER
Filed Oct. 7, 1927   12 Sheets-Sheet 2

Inventors.
Oscar C. Roesen
Isidor Tornberg

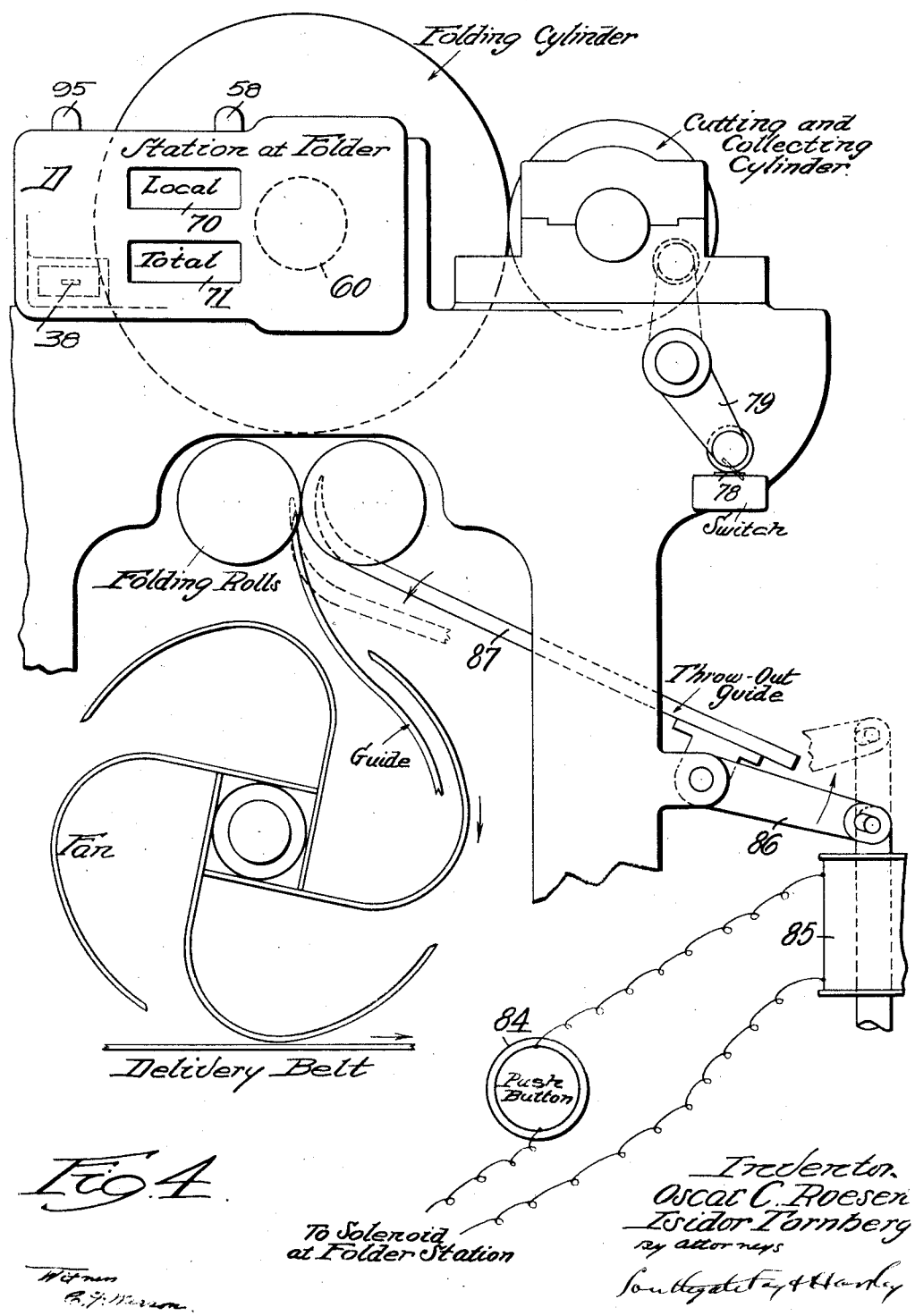

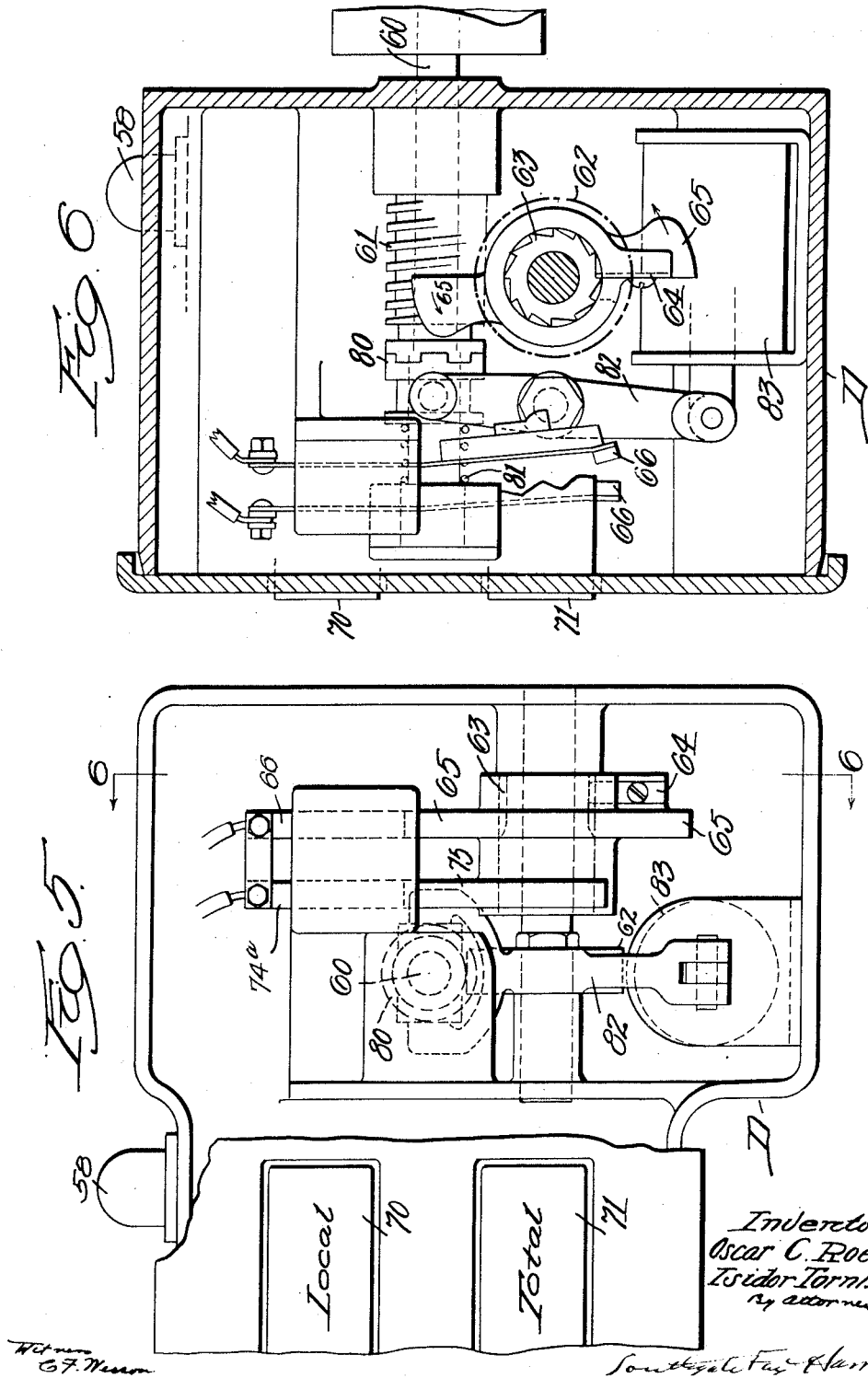

May 1, 1934.  O. C. ROESEN ET AL  1,957,109

PRODUCTION CONTROLLER

Filed Oct. 7, 1927   12 Sheets-Sheet 5

Inventors
Oscar C. Roesen
Isidor Tornberg
By attorneys
Southgate Fay & Hanly

Witness
C. F. Wissa

Inventors
Oscar C. Roesen
Isidor Tornberg

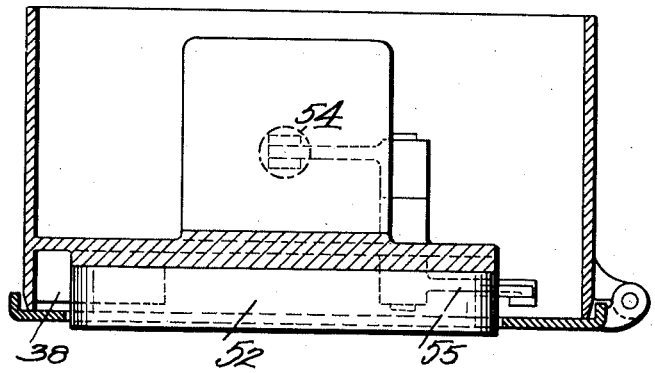
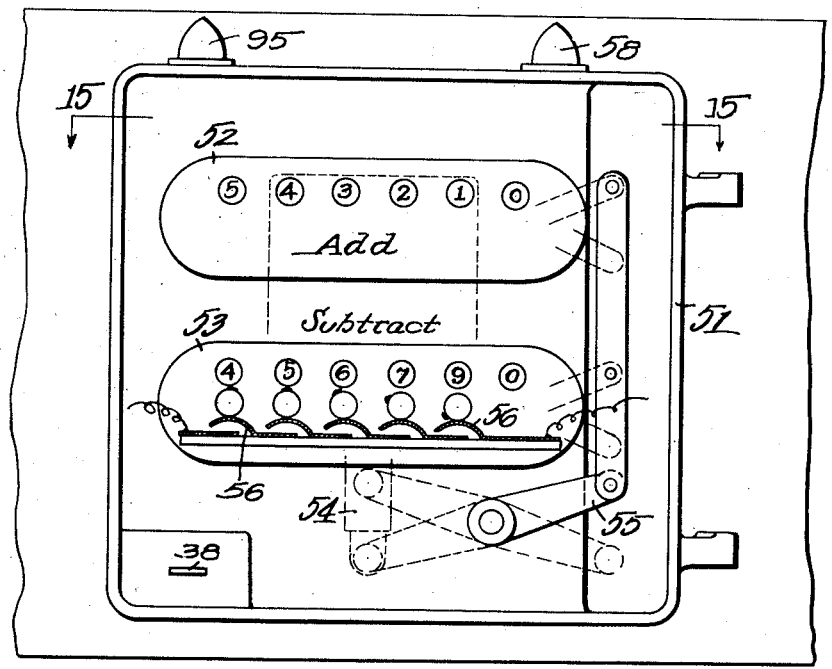

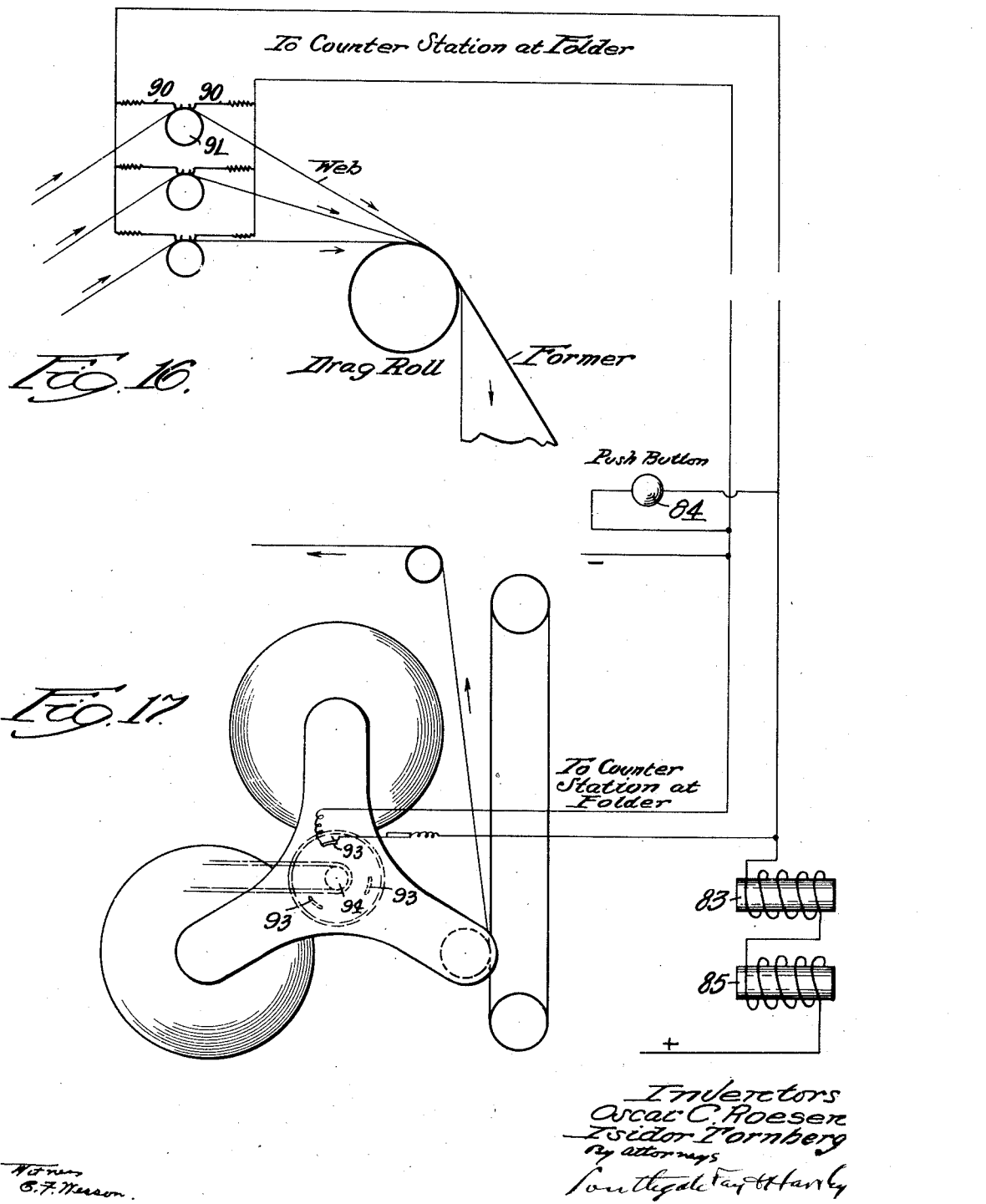

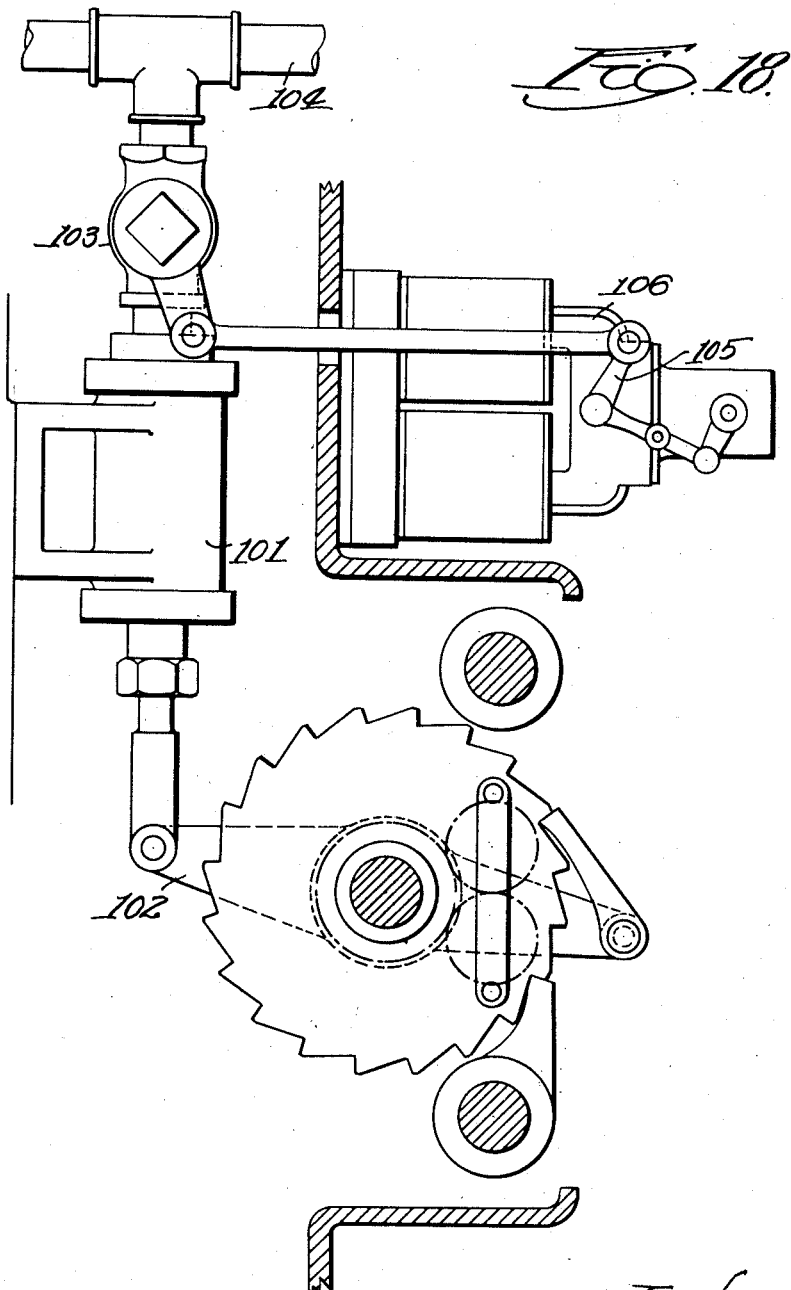

UNITED STATES PATENT OFFICE 1,957,109

PRODUCTION CONTROLLER

Oscar Charles Roesen, Brooklyn, N. Y., and Isidor Tornberg, Plainfield, N. J., assignors to Wood Newspaper Machinery Corporation, New York, N. Y., a corporation of Virginia Application October 7, 1927, Serial No. 224,567

17 Claims. (Cl. 235—92)

This invention relates to a machine and plant for controlling production from a plurality of machines, in such a manner that when all the machines of a system, group, or battery, have together produced a certain quantity of the product, either a signal will be given, or the machines will all be stopped automatically. This invention is an improvement upon and extension to, the invention described and claimed in our prior application filed February 17, 1927, Serial No. 168,883. We refer herein to "accumulators", by which we mean a counter counting the product of more than one machine to which the counts may be run in simultaneously through any one or all of the orders.

The principal objects of the present invention are to connect all of the deliveries of several machines to one accumulator, or a plurality of accumulators as may be desired, independently of each other, and provide means, controlled by the said accumulator or accumulators, for bringing all the machines to a stop when a predetermined number of products have been delivered by them in combination or to give a signal to the operator so that they can be stopped by hand; to provide means by which a greater number of units can be handled more efficiently than was the case with the constructions shown in our above specified application Serial No. 168,883, and by which, if a large number of units function synchronously, the machine will operate in spite of the excessive speed at which the contacts may be made; to provide a plant for the above mentioned purposes in which there may be a plurality of delivery stations from the producing machines, each one having a counter and the counters all registering the total product of all the machines, and each one adapted to be connected to control either one of the several individual accumulators; to provide each producing machine with an individual counter so that the product of each one will be apparent at that machine and with means (an accumulator) whereby each attendant can also know at any time the total number of products that have been delivered from the entire group of machines; to provide a combination of an adding counter and a subtracting counter, so that the adding counter will always show the number of products that have been delivered, and when the subtracting counter registers zero, the adding counter will then indicate the number of products that have been delivered from the entire group of machines; to provide improved means for stopping the count whenever a product is not delivered through the delivery for any reason, and at the same time to provide means for automatically throwing a switch into the path of the product before it reaches the delivery and deflecting one or more products from said path, and at the same time not counting such products as are thus diverted; to provide, in a printing press, means whereby, in case of a web break at any time, the counting operation will be automatically stopped; to provide means whereby whenever two webs are united the defective papers which pass into the folder will be prevented from being delivered in the regular way but will be diverted therefrom and the counter and accumulator, of course, not actuated; and to provide an arrangement whereby twice as many contacts can be made when non-collected products are run as is the case with collected products.

The invention also in addition to the plant referred to above, involves the machine, the objects of which are to operate the counter or accumulator from a source of power independent of the solenoids which control the operation of the same, thereby avoiding the necessity of using bulky solenoids and providing enough power so that if many of them work simultaneously, ample power will be at hand to operate the counting machine; to provide this power operating device in the form of a shaft having a plurality of eccentrics, and means for preventing the eccentrics from operating exactly simultaneously, although the impulses for controlling them may be received simultaneously from several of the units of the plant, thus reducing the ultimate speed of the device; to provide a back gear arrangement, which constitutes a reduction gearing, so that a specific contactor employed will make one-tenth as many revolutions as it would otherwise to register the same count; to so arrange the parts that when an impulse is received in one of the controlling solenoids the effect is merely to permit an operating pawl or equivalent element to come into operative position and it is operated by another source of power as stated; to provide means whereby each of the operating means on said shaft, as for example, eccentrics, are adapted to actuate two different counting elements during a complete rotation, thus reducing by half the number of these operating devices or eccentrics and decreasing the size and cost of the machine; to provide simple means for circumventing the possibility of forward movement of the counter operating means more than one space for any one impulse, regardless of the length of its duration, thereby making it possible for the contacting means at the machine to remain in contact for any length of time while the accumulator continues to work at its usual rate of speed, registering only once; to provide for the proper functioning of the differential mechanism, such as shown in our above mentioned application, and at the same time employ only a single accumulator arm for performing two operations, so that each half of the complete rotation of the operating shaft is utilized, this being done by making adjacent operating means right and left handed; to provide an arrangement by which the working elements are located in two rows instead of one, thereby condensing the mechanism to one-half of the length that would otherwise be required; to provide means whereby the number of magnetic operating units that need be placed at any given station is independent of the power of the electric devices placed therein, the actual work being performed by the rotating shaft mentioned; to provide means whereby all the electric circuits are deadened whenever the door of either the accumulator box or the counter box is opened and a signal light is lighted to show that it is open; and to provide other improvements in the combinations of the various machines and the operating mechanism of the counting machines themselves.

Other objects and advantages of the invention will appear hereinafter.

Reference is to be had to the accompanying drawings in which

Fig. 3 is a wiring diagram;

Fig. 4 is an end view of a folding machine showing one of the stations located thereon, the invention being illustrated herein as applied to the folding machine of a newspaper printing press;

Fig. 5 is a view of one end of one of the counting machines with the cover broke away to show interior construction;

Fig. 6 is a transverse sectional view on the line 6—6 of Fig. 5, showing most of the mechanism in elevation;

Figure 10:
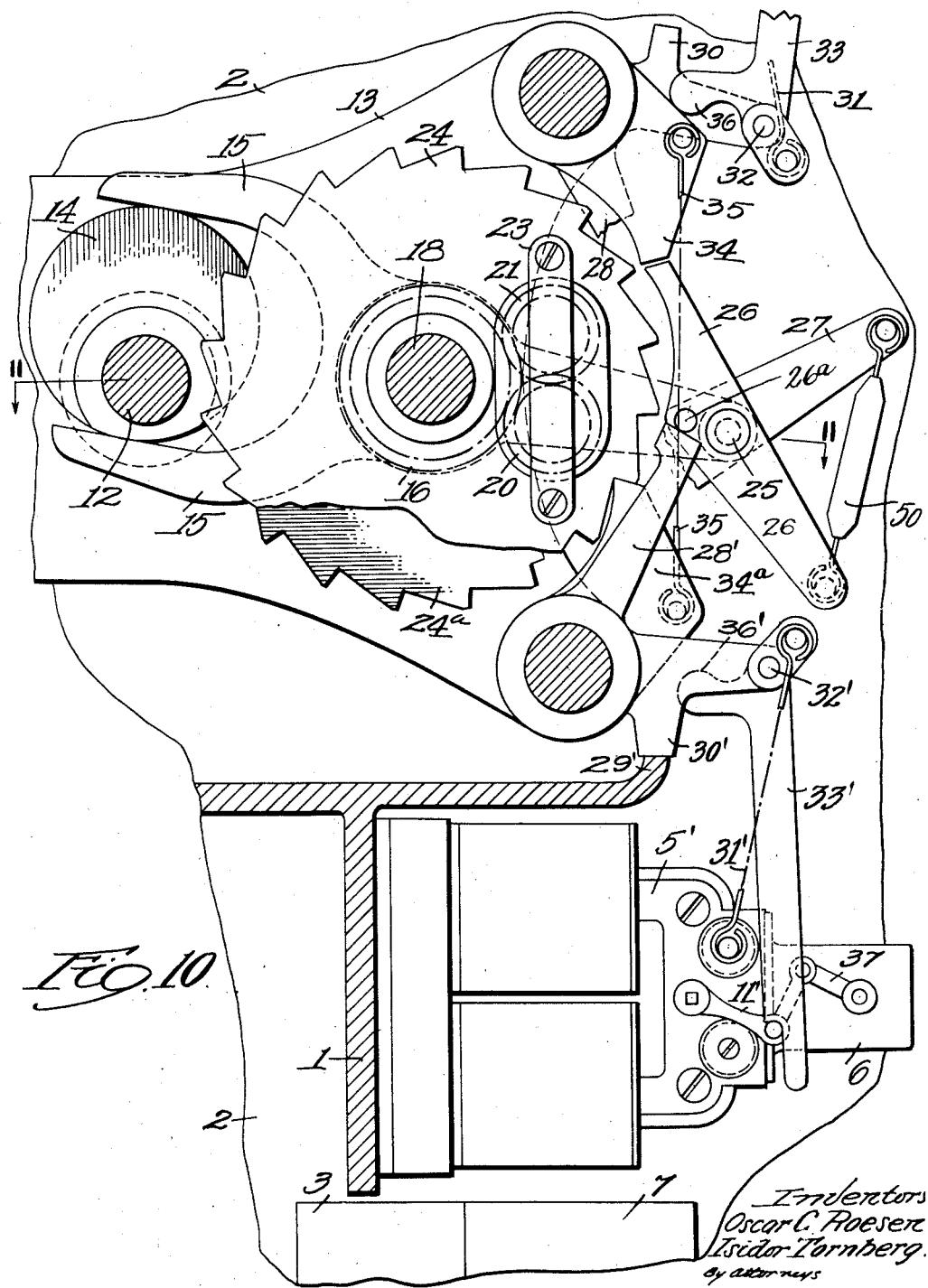
Fig. 10 is a sectional view of the same on the line 10—10 of Fig. 9.

Fig. 10ᵃ is a view similar to Fig. 10 showing the parts above, and Fig. 10ᵇ is a view similar to part of Fig. 10ᵃ showing the parts in a different position.

Figure 11:
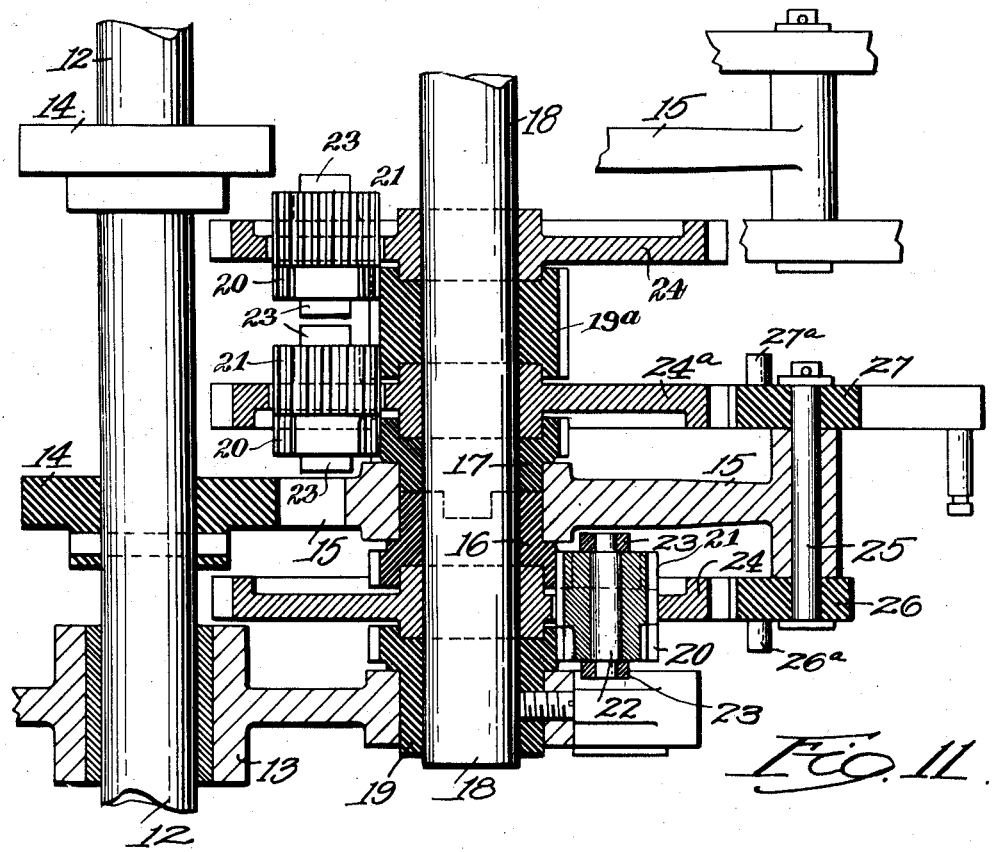
Figure 12:
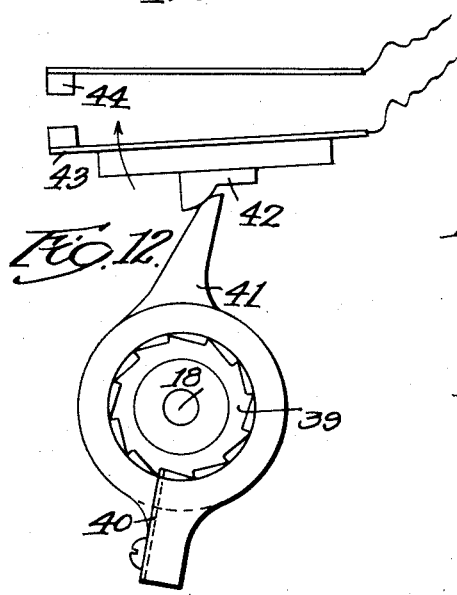
Figure 13:
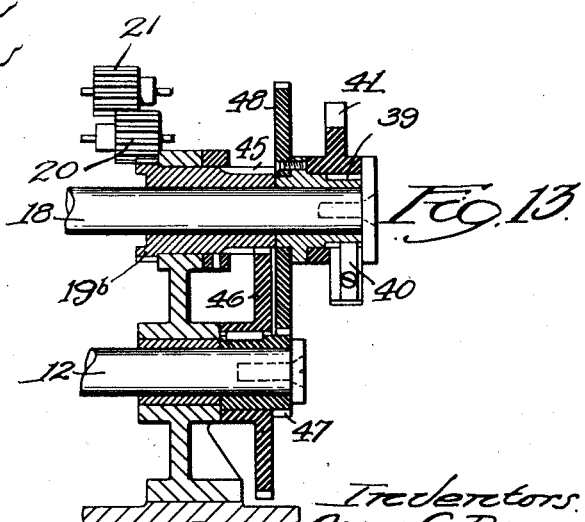

Fig. 11 is a transverse sectional view on the line 11—11 of Fig. 10;

Fig. 12 is an end view of the ratchet shaft and contacting member operated thereby;

Fig. 13 is a sectional view similar to Fig. 11, showing the back gearing for reducing the speed; a modification;

Fig. 14 is an elevation of the instrument at the delivery station;

Fig. 15 is a sectional view on the line 15—15 of Fig. 14;

Fig. 16 is a diagrammatic view showing the connections for automatically operating the counter at the folder station when any web breaks;

Fig. 17 is a diagrammatic view of the reel showing the connections for controlling the counter at the folder station when the two webs are being connected; and Fig. 18 is an elevation partly in section showing a modified way of applying power for operating the counter.

As indicated above, this invention involves a device which shows at all times the cumulative production of several machines and also provides for bringing these machines to a stop either automatically or upon a signal when a predetermined number of products have been delivered by the entire battery of machines. The invention is capable of application to many kinds of machines delivering a product, but it is shown herein and described as being applied to newspaper printing presses. On the large daily newspapers, these presses are set up in a number of batteries of units which can be made to co-operate with each other in various ways. The subject of this invention is a system or plan involving a number of counting devices and accumulators.

Figure 1:
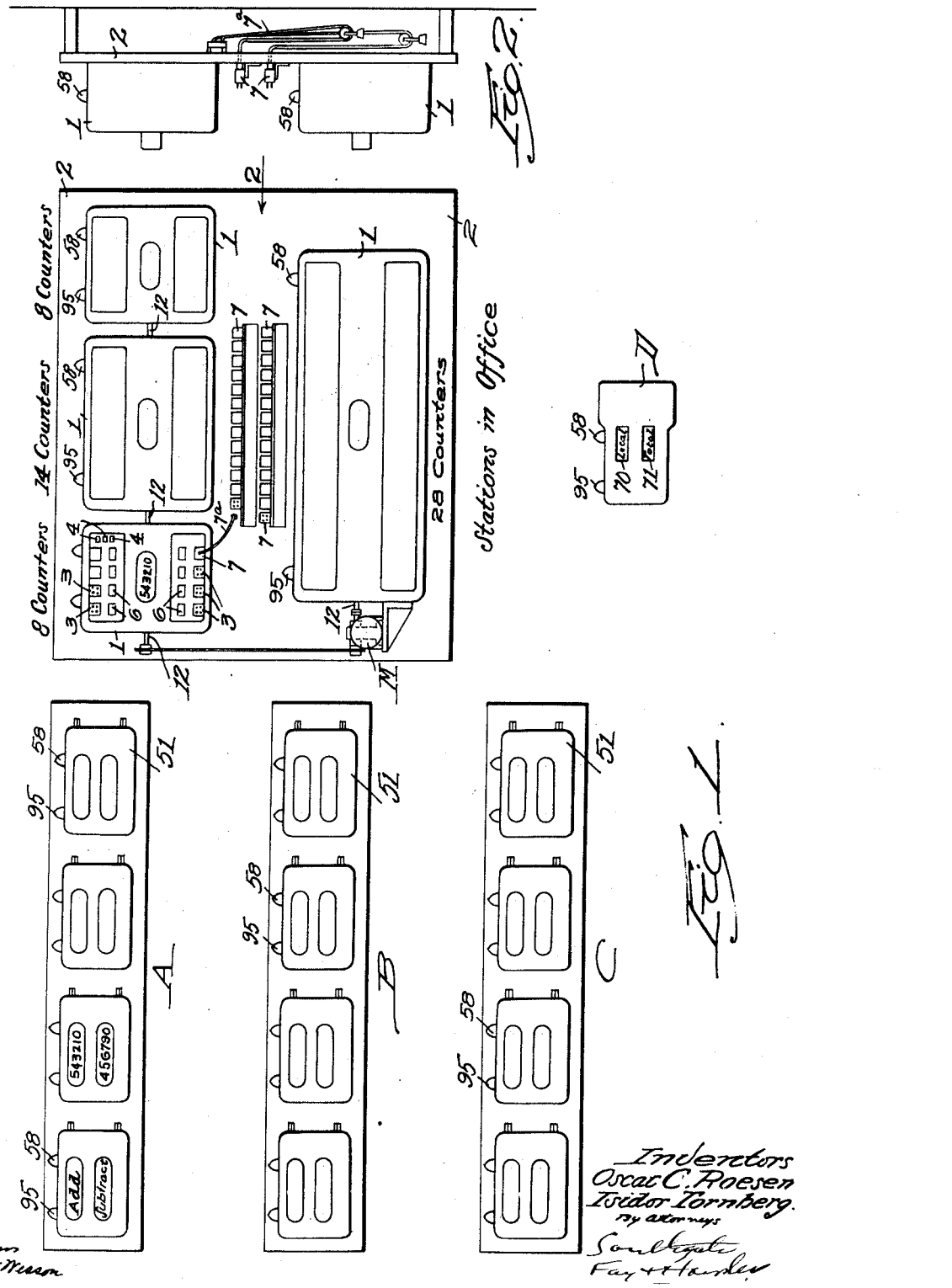
Fig. 1 is a diagrammatic view indicating the various stations that may be employed in connection with the several deliveries and several accumulators at a central point or main office.
Figure 2:
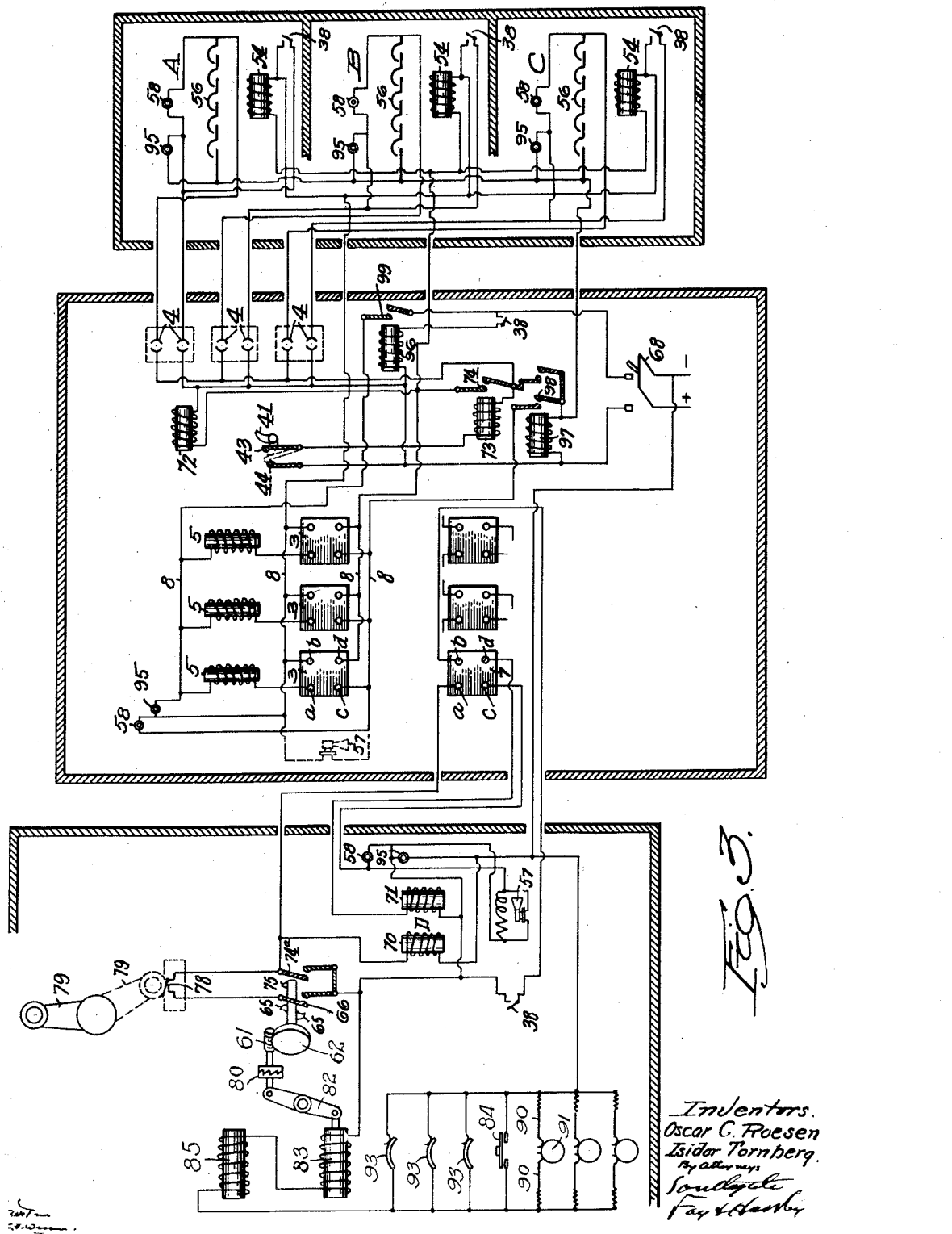
Fig. 2 is a side view of the set of accumulators shown in Fig. 1.
Figure 7:
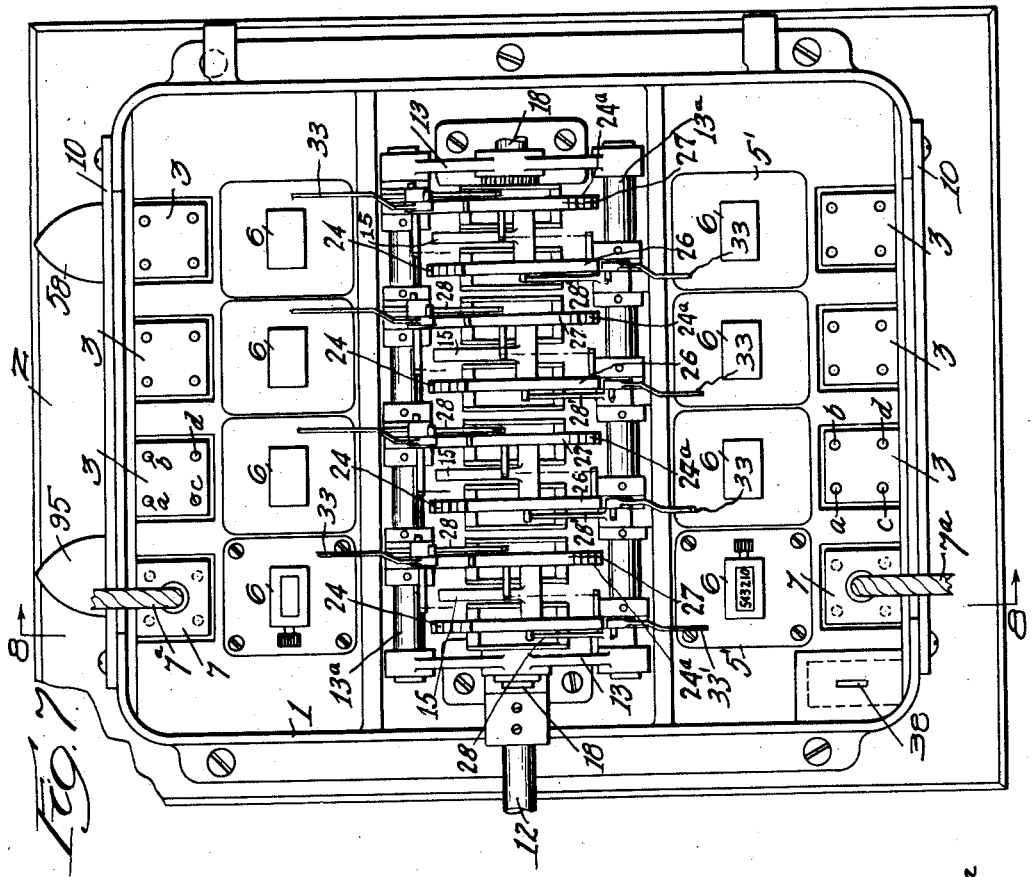
Fig. 7 is a view of one of the accumulators shown in Fig. 1, on enlarged scale with the cover removed to show the parts in elevation.
Figure 8:
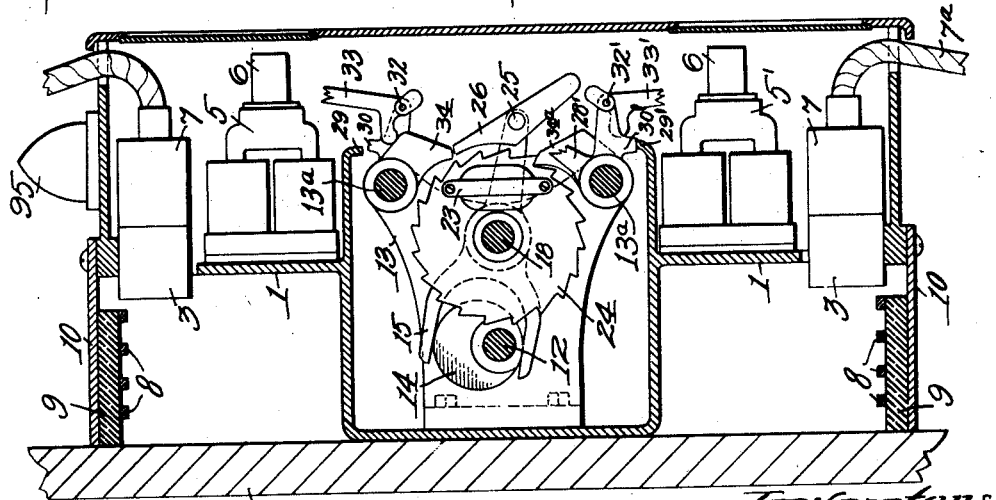
Fig. 8 is a sectional view of the same on the line 8—8 near the end thereof.
Figure 9:
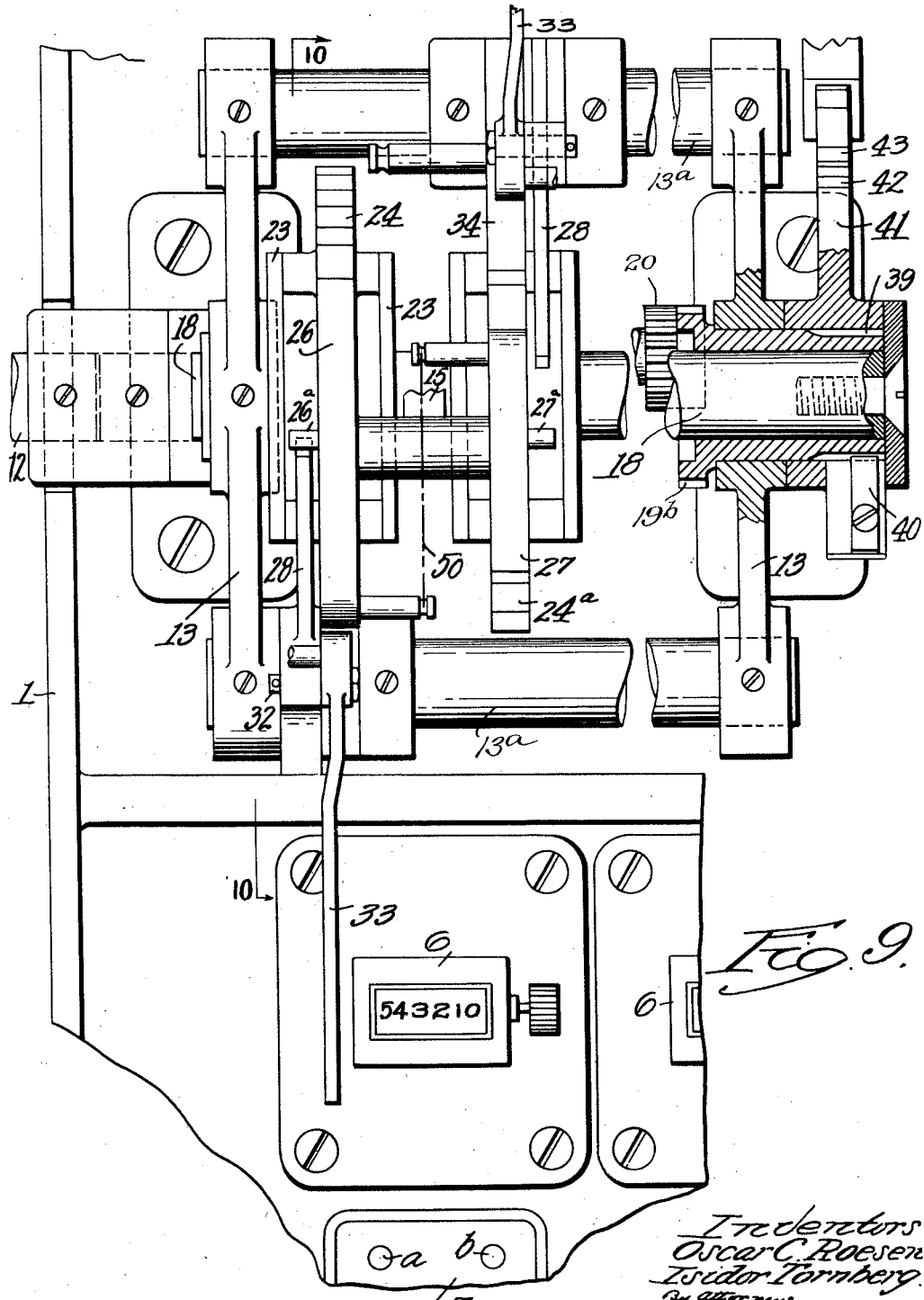
Fig. 9 is an elevation of the accumulator showing certain parts in section.

A general idea of the scheme can be obtained by inspection of Figs. 1 and 3. At a central station, which may be in the office, is a panel frame 2 with one or more accumulators 1. The number of units depends upon the number of machines that are likely to be grouped together in the several plants or rooms to produce any one product. In Fig. 1 are shown four accumulators 1 labeled respectively "8 counters", "14 counters", "8 counters" and "28 counters". This is designed for a plant in which there are twenty-eight producing machines. These twenty-eight machines can be grouped in various ways to produce one, two, three or four different products. If the twenty-eight machines are all grouped to produce the same product, the accumulator marked "28 counters" will be connected with them and will count the entire product of all the machines. Of course, if any smaller number of machines are running, they can also be connected with this accumulator and the products counted in the same way. The twenty-eight machines or less can be divided also into other groups independent of each other. For example, the other three accumulators could take care of the entire product of the twenty-eight machines if divided into three groups of not more than eight, fourteen and eight respectively, or the machines can be grouped in any other way within the limits of the construction. Of course it is understood that this represents merely an example which happens to be convenient in one plant.

The delivery room station shown in Fig. 1 may be duplicated one or more times or may, if desired, be mounted on the panel which has just been described. In these figures, are shown three delivery rooms or groups marked "A" "B" and "C", each one having a plurality of groups of printing machines, each with a group counter 51, and each group of counters wired to control any one of all the four individual accumulators. They are connected by plugs 4 arranged in sets. In these drawings the delivery room or station A is shown as controlling the 8 counter accumulator at the left of the panel board in Fig. 1. The products, in this case folded newspapers, delivered by each machine connected to this particular accumulator which is controlled at station A are counted at each machine and the total for all machines connected to that station is shown at said accumulator at the central station.

Referring to Figs. 1 and 3, when the main line switch 68 is closed, the + side is connected directly to the magnets 96 and 97, in parallel with each other. Magnet 96 will operate only if the door switch 38 at that point is closed. (All door switches are designated 38). If so the door contact 99 is closed by the magnet 96 when the circuit is completed by a contact 43 engaging contact 44, being operated by contactor cam 41, once during each rotation thereof. The closing of these contacts 43—44 energizes the magnet 73, closing the totaling contact 74. This continues the circuit from the magnet 73 to the magnet 72 for the accumulator A. The corresponding magnets 72 for the accumulators B and C are not shown in Fig. 3, but are all put in circuit at the same time. The + terminal is also connected to the plug 4 cutting out the magnet 72 when contacts 43—44 are open. The current now can flow through the lower plug 4 to the door switches 38 of the stations A, B and C. If this switch 38 at station A is closed the operating solenoid 54 of that station is energized, if the plugs 3 and 7 are connected, as the current from the several solenoids 54, or any of them, passes to the several contact points $d$ of the plugs 3 of the 8 counter accumulator on the main panel board 2. Thus the accumulator A operates to count one at each rotation of any one of the contactor cams 41 in its group.

Also, from the lower plug 4 at accumulator A, current can pass to a point between that plug and green and red signal lights 95 and 58. All red lights are designated 58 and all green lights 95. Also connection is made from the magnet 97 to the same point and from magnet 73, upper plug 4 and through light 58.

The several counter contacts 56 at the accumulators A, B and C are connected to this latter line and from the + terminal through the magnet 97. The point to which all the branch circuits connect is connected in series through the door switches 38 with the $b$ contacts of the plugs 3. It is necessary therefore that all these doors be closed, in order to connect these contacts 56 with the + terminals. When an adjustable time relay magnet 97 is energized a switch 98 is closed after the lapse of a little time which connects the + terminal to the $c$ contacts of the plugs 3. Thus the $b$, $c$ and $d$ contacts of the plugs 3 are energized at times from the + terminal. The relay magnet 97 limits the sounding of the siren 57.

The — terminal of the line is connected through the door switch 99 to the magnets 5 and to the $a$ contacts of the plugs 3. The magnets 5 operate the counters 56. Each plug 7 is connected with the corresponding plug 3 so that each pair of contacts on the two plugs are connected and the same is true of the $b$, $c$ and $d$ contacts.

The $b$ contacts of the plugs 7 being connected, as shown, with the + side of the line carry the current through a door switch 38 to a double contact 66. Contacts 66 and 74ª are closed against two terminals of the contact 66 by cams 65 and 75 respectively. The contact 66 is closed twice and the contact 74ª once per revolution, as will be explained. The circuit continues when 66 is closed and 74ª open through a switch 78, which is closed once per revolution of an arm 79. From the open contact 74ª the circuit is completed to the — side of the line, either through the $a$ contacts or through the operating magnet of an individual local folder counter 70 to operate it. Current also passes from the $c$ contacts through the siren 57 and in this circuit the lights 58 and 95 are connected in parallel. The current passes from the $d$ contacts through a total magnet of the counter 71 and light 95 to the — terminal of the line.

In installations where the counters of the several delivery stations are mounted directly on the panel, only four stations are necessary and are connected electrically direct to their respective accumulators without the use of plugs 4 or detachable connections. In Fig. 1 also we have shown counter unit D, one of which is mounted directly on each folder of the printing machine at the delivery point. At station D is a rotary contactor 65 which completes the circuit once during each ten rotations of the folding cylinder, when the invention is used for counting the products of a plurality of printing units. This reference to Figs. 1 and 3 is merely for the purpose of giving a preliminary idea of the arrangement of the whole plant.

The mechanism connected with one of these accumulators and one group of presses or other machines will now be described with particular reference to Figs. 7 to 13 inclusive. In these figures is illustrated one of the eight unit accumulators above mentioned, which comprises a box 1 mounted on a panel 2 and equipped with a series of female plugs 3. There are four of these plugs near the bottom of the box and four near the top as shown. Male plugs 7 are provided to fit them. They are electrically connected as indicated in Fig. 3 with electric U-magnets 5 mounted directly above and below the two series of plugs and equipped with counters 6. These U-magnets are connected up as shown in the wiring diagram to receive impulses from the deliveries in the press room. Male plugs 7 are set down into the desired ones of the female plugs 3 so that their contact points $a$, $b$, $c$, and $d$ will fit together in the order shown in Fig. 3. The plugs 7 are electrically connected to the several deliveries in the press room by flexible cords 7ª so that when any delivery works, the counter will be operated through the U-magnet 5 of this particular counter and its operating arm 11 or 11'. It might be remarked here that in accordance with Fig. 3, the same connections are made to the other accumulators which may be at any time connected up in this section. The connections are made between the several electrical accumulators through bus bars 8 mounted on insulating strips 9 carried by a removable plate 10 which allows for easy inspection of the electrical connections. From Fig. 3 it will be seen that the top connection to solenoids 5, the line connecting points $b$ of plug 3, the line connecting points $c$, and the line connecting points $d$ have common connections to each of the U-magnet units. The use of bus-bars 8, running the length of box 1, facilitates the connection of these common terminals. A unit, in this case, refers to the plug 3, U-magnet 5 and the connecting mechanical mechanism for transmitting the impulse in U-magnet 5 to the shaft 18.

Power for operating the mechanism is obtained from a driving shaft 12 which is driven by means of chain and sprocket or by a very small motor through reduction gearing. This motor is running continuously and rotates the shaft 12 which is mounted in bearing brackets 13 on the box 1. On this shaft are mounted a plurality of eccentrics 14, one for each two machines which are connected with this accumulator. There may be four eccentrics staggered radially so that the eccentrics do not co-incide. This prevents all the eccentrics from operating simultaneously and permits the reduction of the ultimate speed of the machine to the speed of the driving shaft even though all the U-magnets are energized simultaneously.

Each eccentric 14 is straddled by a yoke 15 which is swivelled on a shaft 18. On this shaft are gears 16 and 17 loosely mounted but clutched together so as to rotate as one. The shaft 18 is stationary. It is fixed through the hub of a stationary gear 19 by a set screw or the like. The concentric gears 16 and 19 are connected with each other by means of two double faced gears 20 and 21, journalled on separate studs 22 supported by strips 23 fastened to the ratchet wheel 24.

The gear 20 is in mesh with the gear 19 and the gear 21 while the gear 21 is in mesh with the gears 20 and 16. This forms a differential which accomplishes the object of counting all the products even when two of the machines operate at the same time. It transmits power to the several gears 16, 17 and 19$^a$ loosely surrounding the shaft 18 when the ratchet carrying that differential is rotated by the action of its pawl. This power is transmitted through the chain of the differential gearing to the ratchet 39 on the right-hand end of the shaft 18. The ratchet 24$^a$ is provided with the same mechanism, the gear 19$^a$, transmitting the power to the next set of gearing and serving substantially the same purpose thereto is the gear 19$^b$. The yoke 15 is provided with a stud 25, on which are freely pivoted pawls 26 and 27 at either end. These pawls are both urged toward their respective ratchets by a spring 50.

At each operation of the eccentric 14 the yoke 15 is oscillated through one complete oscillation. During the first half the pawl 26 may, if it is engaged with the ratchet 24, rotate the ratchet 24 a distance of one tooth. On the second or return half of the oscillation, the pawl 27 may likewise rotate the ratchet 24$a$ through a distance of one tooth. These pawls, however, are not always in position to engage the teeth. They are equipped with pins 26$^a$ and 27$^a$ which normally come into contact, each with one of two pivoted toes 28 and 28', which are normally held back against shelves or projections 29 and 29' by springs 31 and 31' respectively. These springs hold the projections 30 and 30' on the toes against the shelves 29 and 29' respectively. Therefore the pawls 26 and 27 are normally held in inactive position. At one end of each toe 28 or 28' on a stud 32 or 32' is pivoted a lever 33 or 33' on one arm of which the spring 31 or 31' is fastened. In this way the spring tends to keep the front end of the lever 33 or 33' against the operating arm 11 or 11' of the U-magnet 5 or 5'. This arm has a stud which enters a notch in the edge of the lever 33 or 33' to actuate it.

As shown at the bottom of Fig. 10 the operating arm 11' is in its normal position when the lower magnet 5' is deenergized. The primed numerals relate to the lower set of mechanism. When the lower magnet 5' is energized so as to register a count, the arm 11' moves in a counterclockwise direction pushing up the lever 33' and rotating the lower toe 28' out of engagement with the pin 26$^a$. This allows the pawl 26 to engage a tooth of the ratchet 24. The oscillatory motion imparted to the yoke 15 by the eccentric 14 causes the pawl 26, urged forward by the spring 50, to advance the ratchet 24 one tooth in a counterclockwise direction. This action also raises the lower back lash pawl 34$^a$. The two pawls 34 and 34$^a$ are pivoted on rods 13$^a$ carried by the brackets 13 and normally held against the two ratchets by a spring 35. The retraction of the back lash pawl 34$^a$ by the ratchet tooth brings it into contact with a projection 36' which forms part of the operating lever 33'. This swings the lever 33' out of engagement with the pin on the swinging end of the operating arm 11 or 11'. This releases the toe 28' and permits it to return to its original position in which it holds the pawl 27 away from engagement with the next tooth of the ratchet. This release also allows the lever 33' to drop to the lower position where it may be reengaged by the pin in the end of the operating arm 11' when and only when magnet 5' is deenergized to allow the arm 11' to return to the position shown in Fig. 10. Therefore, on its subsequent return, regardless of the length of time that the magnet may be energized, the pawl will not actuate the ratchet. This prevents the possibility of movement forward of any ratchet more than one tooth for any one impulse of the magnet, regardless of the duration of the flow of electric current through the magnet. This arrangement makes it possible for the contactor at the producing machine to remain in contact for any length of time while the accumulator will continue to work at its usual rate of speed without advancing more than one tooth of the ratchet. It is, of course, important that any one cycle in the accumulator will be more rapid than the cycles of the contact mechanism at the producing machine.

Every ratchet is shown as operating in the opposite direction to the next one on either side of it, that is, they alternate. This reduces the size of the mechanism and permits the use of a single accumulator arm for two ratchets, and permits of the utilization of each half of each oscillation. There are, therefore, one half as many yoke arms 15 in any one accumulator as there are differentials. In the form shown in the figures above mentioned, four accumulator arms and eccentrics are required, there being eight differentials. This also involves considerable economy in operation. The working elements are located in two rows instead of a single row, thereby condensing the entire mechanism to one-half the length that would otherwise be required.

It will be noticed that the operating arm 11 or 11' of the magnet is connected by means of a link with the actuating lever 37 attached to the counter 6. In this way each oscillation of the U-magnet causes the counter attached thereto to register. This tells the observer at this station the number of products obtained individually from the delivery unit to which the particular U-magnet is connected.

The action of the several differentials is on the same principle as that explained in our previous patent application above identified, that is, the rotation of any ratchet through a given angle will transmit a similar rotation to the contactor 41 rotatably mounted on the shaft 18 at the extreme right end of the apparatus through the several intermediate gears comprising the differentials to the right of the one being operated. If two or more ratchets are operated at any one time, each will transmit the proper rotation through the gears controlled by those ratchets as well as the gears to the right of them. Thus the contactor 41 will be rotated through an angular distance equivalent to the combined angular rotations of the several ratchets. As the electric magnets do not perform the actual operation of rotating the ratchets, but merely set the mechanism so that the work will be done by the motor, the number of units which may be placed in any given box is independent of the power of the solenoids or other electrical devices located therein. This is important because it is practically impossible to provide within the available space solenoids strong enough to rotate such a large number of ratchets at once. The actual work is performed by the rotating shaft 12 upon which the eccentrics 14 are mounted.

At the right hand end the shaft 18 has rotatably mounted thereon a small ratchet 39 which drives a cam 41 through a spring pawl 40 carried thereby. This cam, through an abutment 42 fastened under the underpart of the spring causes a spring switch point 43 to come in contact with a stationary switch point 44 which in turn serves to energize the solenoids operating the counters, as will be explained hereinafter. The cam 41 is mounted in this manner so as to permit its being brought into proper relationship with the switch at the beginning of any counting operation so that no count will be registered on the instrument at the beginning of any run, this being accomplished by rotating the cam forward by hand to a starting point.

Where the number of operating units is so great as to cause contactor 41 to make the contacts too frequently for the safe operation of the solenoid which it controls, I have provided reduction gearing as shown in Fig. 13. This is merely a ten to one back gear arrangement comprising a pinion 45 having an integral gear 19$^b$ meshing with the gear 20, taking the place of cam 41 and connected to it through intermediates 46 and 47 loosely mounted on shaft 12 but fixed together and gear 48 fastened to the ratchet 39. By means of this arrangement the contactor makes one-tenth as many revolutions as it does when no back gears are employed.

Each control box consists essentially of a box 51 containing two counters, one of which 52 adds and the other 53 subtracts with every operation of the solenoid which actuates them. They are both operated by the same solenoid 54 and lever 55. The adding counter is set at "0" while the subtracting counter is set to show whatever quantity of products is desired from the group of presses running on this particular product. When the subtracting counter shows "0", the adding counter will then indicate the number of papers which have been run off from the group of presses delivering those papers which will be the same as the setting of the subtracting counter before the run is started. Whenever the subtracting counter reaches "0", a continuous contact is made through a series of contacts 56 substantially as shown in our application, above identified. This serves to bring those presses to a standstill, sounding a horn or siren 57 and lighting red signal lights 58 at the same time. A dotted connection is shown in Fig. 3 to another siren 57 to be used only if only one siren per accumulator is used.

Referring especially to Figs. 4, 5 and 6 and also to the general views, Figs. 1 and 3, it will be noticed that at each folder there is a counting station D as stated above. It has a local or individual counter 70 and a total or multiple counter 71. On the shaft 60 of the folding cylinder there is a worm 61 which of course turns once for each rotation of the folding cylinder. This operates a worm wheel 62 geared down 1 to 10, which, through a ratchet wheel 63 and pawl 64 operates a double cam 65. This contactor or cam causes a pair of contacts 66 to engage for the purpose of making and breaking a circuit which is connected with one side of the line outside the main switch 68. This circuit, as will appear from the wiring diagram, is connected with the operating magnet of the local counter 70 and with a magnet 5 in the accumulator, that is when the respective plugs 7 are introduced. This connection is made through the contacts $a$ of said plugs 7 and the plugs 3.

Therefore the making of this contact at 66 causes both the accumulator at the central station, and any other accumulator which may be connected up in a series with it, to operate and register a count and also registers a count on the local counter 70 at the station D on the individual folder.

Station D also has a total counter 71. This counter is actuated by a current passing through the accumulator through the contacts $d$ of the plugs 3 and 7 which, of course, are placed in circuit as indicated in Fig. 1 when this particular accumulator is in operation. From the wiring diagram it will be seen that when all connections are made for the proper operation of this invention, the totaling counter magnets 71, 72 and 54, placed respectively at the folder of the press, the main selection board, and the control station, are connected in parallel and operate simultaneously each time the contactor 73 closes the contacts 74.

This shows each pressman the total number of papers that have been delivered at any time from the entire group of presses working at the same time. This appears at the counter 71 and also at the proper accumulator at station A, B, or C as the case may be.

The passing of the current through the counter 70 of course registers the delivery of a paper or other product at the local folder. Information of both characters is available at this point to the pressman or attendant, and at the accumulator point to the attendant having the accumulator in charge. The mechanism for operating the counters 70 and 71 is not shown in detail but consists of an ordinary magnet marked 70 and 71 in Fig. 3 which, when energized, will cause one or more counter wheels in the local counter 70 to revolve one step and register the number of operations of said magnet. The manner in which this actuates the counter is not the subject of this invention and is not set forth herein but it can be accomplished in the same manner as set forth in our above identified application or in any manner known in this art. In position to be operated when the contacts 43—44 are closed is a totaling contacting magnet 73 closing a contact 74.

For the purpose of making this mechanism suitable for both collected and non-collected products, two contactor cams 65 are mounted on a shaft having another contactor cam 75 mounted thereon which closes a contact 74$^a$. The purpose of this is to make twice as many contacts when non-collected products are run as in the case of collected products. In the former case there are twice as many papers delivered in a given time as in the latter. This arrangement is made in order that the count may represent the actual number of papers delivered instead of the revolutions. Therefore we prevent alternate impulses through the circuit by opening a contact 78. This is done by an arm 79 operated by a cam on the end of the cutter cylinder, as shown in Fig. 4. To do this a wire is run from the contact 66 made by the contactor, through contact 78, to the accumulator. The arm 79 is placed in either of two positions as indicated in full and dotted lines in Fig. 3 according to whether collected or non-collected products are being delivered. When the lever 79 is in the position shown in dotted lines the contact 78 is closed all the time and the circuit is closed twice for each revolution of the cutting and collecting cylinder. This is the position of this lever when non-collected products are run. When running collected products, this lever is raised to the position shown in full lines in Fig. 3. Then the closing of the contact 66 has no effect but only the contact 74ᵃ. Thus one-half as many impulses are sent over the wiring because one-half as many products are being delivered.

Of course, means have to be provided in all cases for resetting the several counters to zero when any particular run is finished.

Sometimes while the press continues to operate no paper is delivered to the delivery. This may be due to the breaking of the web entering the folder, to the necessity of taking out a paper for inspection before it reaches the delivery, or to the fact that, when connecting the new web to the old at full speed, several papers containing the pasted sections of the web will be eliminated from the delivery as they are not perfect papers. When any of these things happen it is desirable to stop the count at that machine, although the machine is operating.

For the above purpose, a clutch 80 is provided which normally is closed by a spring 81 and connects the worm 61, which otherwise is free, with the shaft 60. This clutch may be thrown out of mesh by operating a clutch lever 82 by means of a solenoid 83. This solenoid may be energized in several ways. One of these involves a push-button 84 which is pressed to energize a solenoid 85. This solenoid 85 operates an arm 86 which is pivoted, and to which is connected, a throw-out guide 87. The action of this solenoid moves the throw-out guide into the dotted line position in Fig. 4, where it is in the path of the papers coming through the folding rolls and deflects them out along the guide in a different path from the regular delivery.

The solenoid 85 is in the same circuit with the solenoids 83 and in series with it, so that when the push-button 84 is depressed, the clutch 80 will be disconnected and the count will be stopped as long as the push-button is held down.

To stop the count on account of a break in the web, we use the construction shown in Fig. 16. Here pairs of electric contacts 90 rest on the web running over rolls 91 leading into the form rolls of the folder. The contacts in pairs are insulated from each other by the web itself. If a web breaks at any time contact is established through the rolls between the two contacts which causes a connection between the two wires of the circuit in which the solenoid 85 and solenoid 83 are located. This, of course, acts in the same way as just above described.

In Fig. 17, the paper reel and pasting device are indicated. The contact 93 is provided on a cam shaft 94, on which the reel is located. This provides the necessary contact three times during each revolution of the reel, that is, when the reel gets up to pasting position. This also completes a parallel circuit to the solenoids 83 and 85 as above described. The same actions take place.

Switches 38 are provided, for closing a circuit whenever any door of the apparatus is closed. In the circuit of each switch are green lights 95 which are located at the tops of the several accumulators and counters. When the switches are closed, due to the closing of the doors, a green light 95 is displayed at the respective station, and when the door is open, of course this light goes out. As stated, the red lights 58 burn when the horns sound. A magnet 96 is located in the circuit to close the door contact 99, thus relieving the switch 38 on the selection board from carrying all the operating current.

An adjustable time relay 97 is wired in circuit to limit the time of sounding of the siren 57 after the press has stopped. This operates to open the switch 98 after some time has elapsed.

In Fig. 18 we show a similar mechanism to the one described above except that hydraulic or pneumatic power is employed instead of mechanical power to rotate the ratchets. An electromagnet 106 is employed to operate the valve which sets the hydraulic or pneumatic mechanism into action. In this instance a pneumatic cylinder 101 having a piston which is connected by links to ratchet 102 is used for operating the counter. Air is admitted to the upper end of the pneumatic cylinder through a valve 103 from a pipe 104. The operation of the valve 103 is accomplished through an actuating lever 105 mounted on the magnet 106. This device is similar to the one described above inasmuch as in both cases the electric apparatus is merely employed to throw into action a more powerful apparatus, as a pneumatically operated piston. The principal difference between the two lies in the fact that no device need be employed in the pneumatic design for preventing more than one tooth of the ratchet to be rotated for any given impulse of the electric magnet. On the other hand, this design does not prevent more than one unit to be actuated at one and the same time as is the case with the mechanically operated one.

When it is desired to operate this mechanism the selections are made at the selection board of the presses to be connected to any one accumulator. These are connected by the insertion of plugs 7 which are connected to individual folders in complementary plugs 3 such that points a, b, c and d of the two complementary plugs are connected respectively. The next duty at the main selection board is to select the proper control station A, B, or C which is done by a two-pronged short-circuiting plug placed in one of the three sets of contacts 4. Main line switch 68 is closed and then the door to the main selection board, the latter of which closes the door switch 38. The closing of switch 38 energizes the coil 96 closing contacts 99. This places a line feeding the upper connection of magnets 5 in direct connection with one side of the power. The next operation is performed at the control station where the adding and subtracting counters are set, the latter for the number of papers desired and the former at zero, after which time the door on the control station is closed, closing contact 38.

Let us assume, for illustration, that control station A is being used and a short-circuiting plug is placed in the upper set of contacts 4. The insertion of short-circuiting plug in contact 4 immediately lights up light 58 of the control station signifying that the selections have been made at the main selection board. With all adding counters set to zero and the door of station D, which is placed on the folder, closed, such that door switch 38 is closed also, lights 58 show at all three stations of the mechanism and everything is ready for the beginning of the run.

The rotation of the folder causes contact cams 65 and 75 to which they are geared, to rotate, closing contacts 66 and 74ᵃ. With arms 79 shown in the dotted position, contacts 66 are the ones which send impulses into the mechanism. With arms 79 in the full line position contacts 66 are inoperative and contacts 74ᵃ perform this function. The making of each contact at the folder causes counters 70 and magnet 5 to register a count. As the counts are accumulated by magnet 5 cam 41 is rotated until contacts 43 and 44 are closed, at which time contactor 73, through the closing of contacts 74, causes totaling counters 72 at the main selection board, 54 at the control station, and 71 at the folder to register a totalized count. As described above, the closing of contacts 90 and 91 or those of push button 84 or those of 93 energize coils 83 and 85 to disengage the clutch 80, thereby stopping the count on that particular folder. When contacts 43 and 44 have made sufficient connections such that the subtracting count at station A has reached zero, all of the flexible contacts 56 will be closed, thereby creating a closed circuit which illuminates red lights 95 and sounds klaxon 57 to announce the termination of the run. A time relay 97 limits the time that the warning signal is given so that it is not necessary to open the door of the main selector board or cut off the power in any way to shut off the warning signal after it has been sounded for a sufficient time.

Although we have illustrated and described only two forms of the invention we are aware of the fact that modifications can be made therein by any person skilled in the art without departing from the scope of the invention as expressed in the claims. Therefore, we do not wish to be limited to all the details of construction herein shown and described, but what we do claim is:—

1. In a printing press counting system comprising a plurality of printing presses, an accumulator including a counting device, electric connections from a plurality of presses to the accumulator for connecting the counting device in the accumulator whenever any of the presses connected therewith produce a predetermined number of products and said counting device at the accumulator being adapted to register the total product of the presses, the combination of a contactor mounted to rotate with the shaft of the folding cylinder of each press, and means whereby, when collected products are being run, contacts will be made to energize said circuits in direct proportion to the number of rotations of the folding cylinder and when non-collected products are run twice as many contacts will be made.

2. In a newspaper printing plant comprising a plurality of printing presses and their folders and paper supply reels, an accumulator for counting the products of said presses, and electrical connections from the several folders to the accumulator for actuating the accumulator from each and all of said presses, so that the accumulator will register the total product of the entire group of presses, the combination of means on each paper reel for establishing a parallel circuit each time the reel comes to pasting position and throwing out the connection to the accumulator, as far as that press is concerned, until the reel passes beyond pasting position, for the purpose of permitting of the throwing out of the papers damaged by the pasting and the interruption of the count while that particular number of papers are going through.

3. In a newspaper printing plant comprising a folder, a paper supply reel, means for counting the products, and electrical connections from the folder to the counter for actuating the counter from said folder, the combination of means on the paper reel for establishing a circuit each time the reel comes to pasting position and throwing out the connection to the counter until the reel passes beyond pasting position, and means operated by said circuit for throwing out the papers damaged by the pasting.

4. The combination with a folder for a newspaper printing machine, and a folding cylinder shaft, of a counter located thereon, a casing for the counter into which said shaft projects, a pair of electric contacts adapted to be operated by said shaft at suitable intervals for completing a circuit connected with said local counter, a magnet, means for operating said magnet, and means operated by said magnet for disconnecting the contact closing means from the shaft while the magnet is energized.

5. The combination with a folder for a newspaper printing machine, and a folding cylinder shaft, of a local counter, means adapted to be operated by said shaft at suitable intervals for completing a circuit connected with said local counter, magnetic means, operating for disconnecting the contact closing means from the shaft while the magnetic means is energized.

6. The combination with a folder for a newspaper printing machine, of a counter located thereon, said counter having a counting device arranged to show the production of said folder, a folding cylinder shaft, a pair of electric contacts adapted to be operated by said shaft at suitable intervals for making a circuit connected with said counter, magnetic means, operating when the paster is being made, for disconnecting the contact closing means from the shaft while the magnetic means is energized.

7. In a production controller, the combination with a shaft connected with a machine, a worm loose on said shaft, a wheel meshing with and operated by the worm, a pair of contacts, means rotating with the wheel for closing said contacts and completing an electric circuit, a counting device, means in said circuit for actuating the counting device, means for connecting the worm with the shaft, and independently operated means for disconnecting the worm from the shaft and stopping the count.

8. In an accumulator, the combination with a counting device, of a constantly rotating shaft, a yoke mounted to swing on a pivot, the shaft being provided with means for moving the yoke back and forth through an entire oscillation for each rotation of said shaft, two pawls carried by the yoke, two ratchet wheels mounted to turn independently on the axis of oscillation of the yoke, means for normally keeping said pawls out of engagement with the two ratchet wheels, and electrically operated means for releasing either pawl, or both, into contact with their ratchet wheels so that the ratchet wheels will be operated either on the forward or back stroke of the yoke by the power of said shaft and actuation of both ratchet wheels can be obtained by one rotation of the shaft.

9. In an accumulator, the combination with a counting device, of a constantly rotating shaft, a yoke mounted to swing on a pivot, the shaft being provided with means for moving the yoke back and forth through an entire oscillation for each rotation of said shaft, two opposite pawls carried by the yoke, two ratchet wheels mounted to turn and having opposite directions of rotation, means for normally keeping said pawls out of engagement with the respective ratchet wheels, and means for releasing either pawl or both into contact with their ratchet wheels so that both ratchet wheels can be operated by one rotation of the shaft.

10. In an accumulator, the combination with a counting device, of a pair of ratchet wheels arranged as rights and lefts, a pair of pawls extending in opposite directions for operating the two ratchet wheels respectively, a yoke carrying said pawls and pivoted to swing, power operated means for swinging the yoke constantly back and forth, operating means for moving either or both pawls into contact with their respective ratchet wheels, a differential mechanism carried by each ratchet wheel, and means cooperating with the differential mechanism for operating the counter.

11. In an accumulator, the combination with a counting device, of a pair of ratchet wheels arranged as rights and lefts, a pair of pawls extending in opposite directions for operating the two ratchet wheels respectively, a yoke carrying said pawls and pivoted to swing, power operated means for swinging the yoke constantly back and forth, electromagnetic operating means to allow either or both pawls to engage with their respective ratchet wheels, two gears mounted on the axis of the yoke, free to rotate on the shaft as one, two gears carried by each ratchet wheel, meshing with each other, and each meshing with one of said gears, and means operated by the free gear for actuating the counter.

12. In an accumulator, the combination with a counter, a ratchet wheel, differential means partly mounted on the ratchet wheel for transmitting the motion of the ratchet wheel to the counting device to operate it, a swinging support, power operated means for constantly swinging said support, a pawl pivoted on said support, means for normally holding the pawl out of contact with the teeth of the ratchet wheel, electromagnetic means to release the pawl to engage the teeth and thus operate the wheel by power, and means for energizing the electromagnetic means when it is desired to register a count.

13. In an accumulator, the combination with a counter, a ratchet wheel, means for transmitting the motion of the ratchet wheel to the counter to operate it, a swinging support, power operated means for constantly swinging said support, a pawl pivoted on said support, means for normally holding the pawl out of contact with the teeth of the ratchet wheel, means to release the pawl for engaging the teeth and thus operate the wheel by power.

14. In an accumulator, the combination with a ratchet wheel, a counter, and means to operate the counter to register by the ratchet wheel, a pawl for operating the ratchet wheel having a pin thereon, a pivoted toe engaging the pin to hold the pawl from the ratchet wheel, an operating arm pivoted on the toe, an actuator for moving said operating arm to swing the toe and allow the pawl to engage the ratchet wheel, and a spring for operating the pawl in that direction.

15. In an accumulator, the combination with a ratchet wheel, a counter, and means for operating the counter as the ratchet wheel moves, of a pawl adapted to actuate the ratchet wheel one step at a time, a backlash pawl adapted to engage the teeth of the ratchet wheel and prevent further motion, yielding means for holding the backlash pawl against the ratchet wheel, an operating lever for controlling the first named pawl, and means on said lever adapted to be engaged by the backlash pawl to throw the first named pawl into inoperative position.

16. In an accumulator, the combination with a pair of ratchet wheels, a counter, and means for operating the counter when the ratchet wheels move a definite space, of pawls adapted to actuate each ratchet wheel one step at a time, and backlash pawls adapted to engage the teeth of each ratchet wheel and prevent reverse motion, operating levers having means for holding the actuating pawls away from their respective ratchet wheels, operating arms normally engaging the levers to operate them when the arms move, and means whereby the motion of the backlash pawls away from the ratchet wheels, disengages the operating levers from the operating arms individually.

17. In an accumulator having a counter, the combination with a ratchet wheel for operating the counter, a power shaft and a shaft parallel therewith, of a pawl for operating the ratchet wheel, means pivoted on the second shaft for operating the pawl, means for operating the pawl-operating means from the power shaft, a back gear construction centered on the power shaft, a contact maker loose on the parallel shaft and connected with the back gear arrangement to rotate at a slower speed than the power shaft, a pair of contacts operated by the contact maker, and a magnet for controlling the operation of the ratchet located in a circuit adapted to be closed by said contact.

OSCAR CHARLES ROESEN.
ISIDOR TORNBERG.